United States Patent
Hiramatsu et al.

(10) Patent No.: US 8,977,875 B2
(45) Date of Patent: Mar. 10, 2015

(54) POWER SUPPLYING CONTROL APPARATUS, MANAGEMENT CONTROL APPARATUS, IMAGE PROCESSING APPARATUS, AND COMPUTER READABLE STORAGE MEDIUM

(75) Inventors: Hisaji Hiramatsu, Kanagawa (JP); Hidenori Itoh, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 405 days.

(21) Appl. No.: 13/473,346

(22) Filed: May 16, 2012

(65) Prior Publication Data

US 2013/0073885 A1 Mar. 21, 2013

(30) Foreign Application Priority Data

Sep. 15, 2011 (JP) ................................ 2011-202397

(51) Int. Cl.
- G06F 1/32 (2006.01)
- H04N 1/00 (2006.01)
- H04N 1/32 (2006.01)

(52) U.S. Cl.
CPC ............ G06F 1/3231 (2013.01); G06F 1/3284 (2013.01); *Y02B 60/1267* (2013.01); *Y02B 60/32* (2013.01); *H04N 2201/3298* (2013.01); H04N 1/00891 (2013.01); H04N 1/00933 (2013.01); H04N 1/32443 (2013.01); *H04N 2201/0094* (2013.01)
USPC ............................ 713/320; 713/300; 713/310

(58) Field of Classification Search
CPC ..................................................... G06F 1/3203
USPC ........................................... 713/320, 300, 310
See application file for complete search history.

(56) References Cited

U.S. PATENT DOCUMENTS

| | | | | |
|---|---|---|---|---|
| 5,121,479 A | * | 6/1992 | O'Brien | 710/34 |
| 6,045,274 A | * | 4/2000 | Nakanishi | 400/54 |
| 2005/0030791 A1 | * | 2/2005 | Liang et al. | 365/185.11 |
| 2005/0169053 A1 | * | 8/2005 | Lin et al. | 365/185.03 |
| 2005/0250456 A1 | * | 11/2005 | Motohashi | 455/92 |
| 2007/0119937 A1 | | 5/2007 | Kikuta | |

FOREIGN PATENT DOCUMENTS

| | | |
|---|---|---|
| JP | 2005-305652 A | 11/2005 |
| JP | 2007-148594 A | 6/2007 |

* cited by examiner

*Primary Examiner* — Zahid Choudhury
(74) *Attorney, Agent, or Firm* — Sughrue Mion, PLLC

(57) ABSTRACT

A power supplying control apparatus includes a transition unit that causes a control apparatus to transition to one of a power supplied state that causes power to be supplied and a power shutoff state that shuts off the supplying of power, and a determining unit that determines a transition target of the transition unit in accordance with a first time period and a second time period, the first time period having a length of time beyond which no further memory space is available from a second memory, and thus being determined by a transmission and reception speed of information to a communication line network and a storage capacity of the second memory, the second time period being so long as to enable information stored on the second memory to be stored on a first memory in the power shutoff state.

15 Claims, 12 Drawing Sheets

POWER SUPPLYING CONTROL APPARATUS, MANAGEMENT CONTROL APPARATUS, IMAGE PROCESSING APPARATUS, AND COMPUTER READABLE STORAGE MEDIUM

CROSS-REFERENCE TO RELATED APPLICATIONS

This application is based on and claims priority under 35 USC 119 from Japanese Patent Application No. 2011-202397 filed Sep. 15, 2011.

BACKGROUND (i) Technical Field

The present invention relates to a power supplying control apparatus, a management control apparatus, an image processing apparatus, and a computer readable storage medium.

(ii) Related Art

In related art, a power-saving function has been typically featured in an image forming apparatus, an image reading apparatus, and an image processing apparatus as a combination thereof. For example, if a communication process, such as a process including data writing and data reading, requested from a terminal apparatus (a host apparatus or a personal computer (PC)) connected to those apparatus via a communication line network in a mutually communicable fashion remains unexecuted in one of those apparatuses for a predetermined period of time or longer, the apparatus automatically transitions into a power-saving state in which supplied power is limited to a minimum.

In the discussion that follows, the terminal apparatus may also be referred to as a host apparatus or a PC, the communication line network may also be referred to as a network, and the communication process may also be referred to as an access.

SUMMARY

According to an aspect of the invention, a power supplying control apparatus is provided. The power supplying control apparatus includes a transition unit and a determining unit. The transition unit causes a control apparatus to transition to one of a power supplied state that causes power to be supplied and a power shutoff state that shuts off the supplying of power. The control apparatus includes a first memory control unit including a reference signal generator generating a reference signal serving as a reference of a control operation. The first memory control unit writes information to or reads information from a first memory in response to the reference signal. The control apparatus also includes a communication line network control unit that controls communications with a communication line network, and includes a second memory that temporarily stores information, serving as a buffer between a transmission and reception speed of information from the communication line network and a processing speed of the first memory control unit operating in response to the reference signal. The determining unit determines a transition target of the transition unit in accordance with a first time period and a second time period, the first time period having a length of time beyond which no further memory space is available from the second memory, and thus being determined by the transmission and reception speed of the information to the communication line network and the storage capacity of the second memory, the second time period being so long as to enable the information stored on the second memory in the power shutoff state to be stored on the first memory via the first memory control unit.

BRIEF DESCRIPTION OF THE DRAWINGS

Exemplary embodiments of the present invention will be described in detail based on the following figures, wherein.

DETAILED DESCRIPTION

First Exemplary Embodiment

Figure 1:
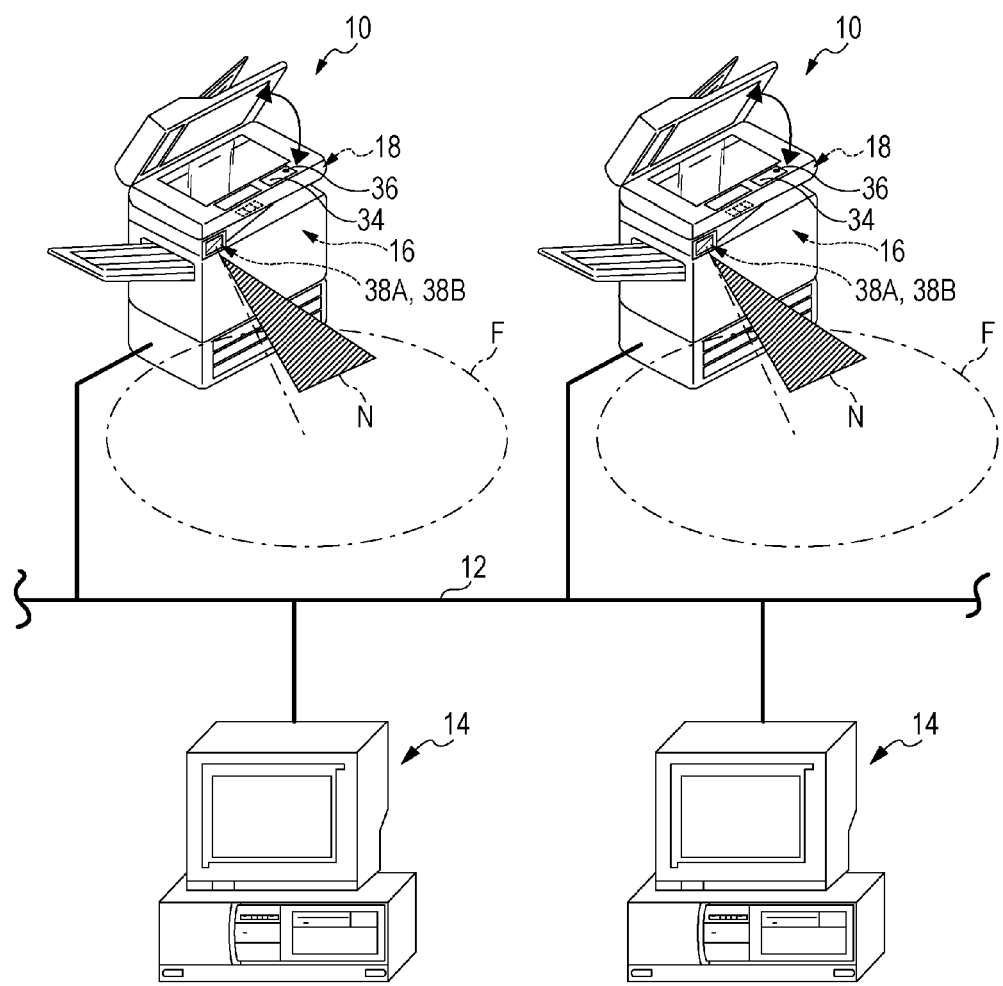
FIG. 1 is a configuration diagram of a communication line network including an image processing apparatus in accordance with a first exemplary embodiment.

An image processing apparatus 10 of a first exemplary embodiment is connected to a communication line network 12 such as the Internet as illustrated in FIG. 1. As illustrated in FIG. 1, two image processing apparatuses 10 are connected to the communication line network 12. The number of image processing apparatuses 10 is not limited to two. One image processing apparatus 10 may be connected, or three or more image processing apparatuses 10 may be connected.

Multiple host computers (personal computer (PC)) 14 may be connected as an information terminal apparatus to the communication line network 12. As illustrated in FIG. 1, two host computers 14 are connected to the communication line network 12. The number of connected host computers 14 is not limited to two. One host computer 14 may be connected, or three or more host computers 14 may be connected. The host computer 14 is not necessarily connected to the communication line network 12 via a wired connection. A communication line network that wirelessly exchanges information may be used to connect the host computer 14 to the communication line network 12.

As illustrated in FIG. 1, the image processing apparatus 10 may receive image data and an instruction to perform an image forming (printing) process from a remote host computer 14. Alternatively, a user may stand in front of the image processing apparatus 10 and perform a variety of operations to instruct the image processing apparatus 10, including a copying process, a scanning process (image reading), a facsimile transmission and reception process.

Figure 2:
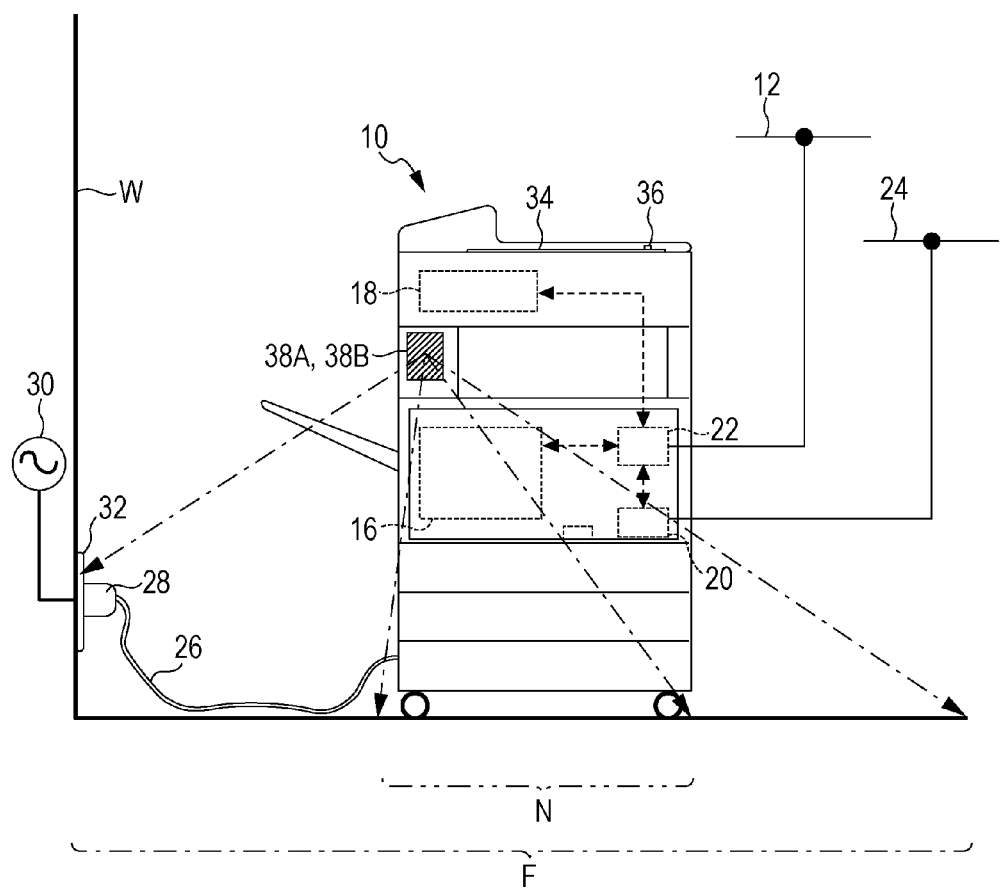
FIG. 2 is a diagrammatic view of the image processing apparatus of the first exemplary embodiment.

FIG. 2 illustrates the image processing apparatus 10 of the first exemplary embodiment.

The image processing apparatus 10 includes an image forming unit 16 that forms an image on a recording paper sheet, an image reading unit 18 that reads a document image, and a facsimile communication controller 20. The image processing apparatus 10 includes a central controller 22. The central controller 22 controls the image forming unit 16, the image reading unit 18, and the facsimile communication controller 20. The central controller 22 temporarily stores image data read from the document image by the image reading unit 18, and transfers the read image data to one of the image forming unit 16 and the facsimile communication controller 20.

The central controller 22 is connected to the communication line network 12 such as the Internet. The facsimile communication controller 20 is connected to a telephone line network 24. The central controller 22 is connected to the host computer 14 (see FIG. 1) via the communication line network 12. The central controller 22 receives image data from the host computer 14. The central controller 22 further performs a facsimile reception operation and a facsimile transmission operation via the telephone line network 24 using the facsimile communication controller 20.

The image reading unit 18 includes a document platen that allows an original document to be placed in alignment, a scanning driving system that scans an image of the original document placed on the document platen with a light beam, and a photo-electric conversion device, such as a charge-coupled device (CCD), which receives light that is reflected from or passes through the original document through the scanning of the scanning driving system.

The image forming unit 16 includes a photoconductor. Around the photoconductor, the image forming unit 16 includes a charging module, a scanning-exposure module, an image development module, a transfer module, and a cleaning module. The charging module uniformly charges the photoconductor. The scanning-exposure module causes a light beam to scan in accordance with the image data. The image development module develops into an image an electrostatic latent image formed through scanning-exposure by the scanning-exposure module. The transfer module transfers the image developed on the photoconductor to a recording paper sheet. The cleaning module cleans the surface of the photoconductor subsequent to a transfer operation. A fixing module that fixes the transferred image on the recording paper sheet is arranged on the conveyance path of the recording paper sheets.

The image processing apparatus 10 has an input power cord 26 with a plug 28 at one end thereof. The plug 28 is inserted into a wall socket 32 of a commercial power source 30 at a wall W, and the image processing apparatus 10 is supplied with power from the commercial power source 30.

Figure 3:
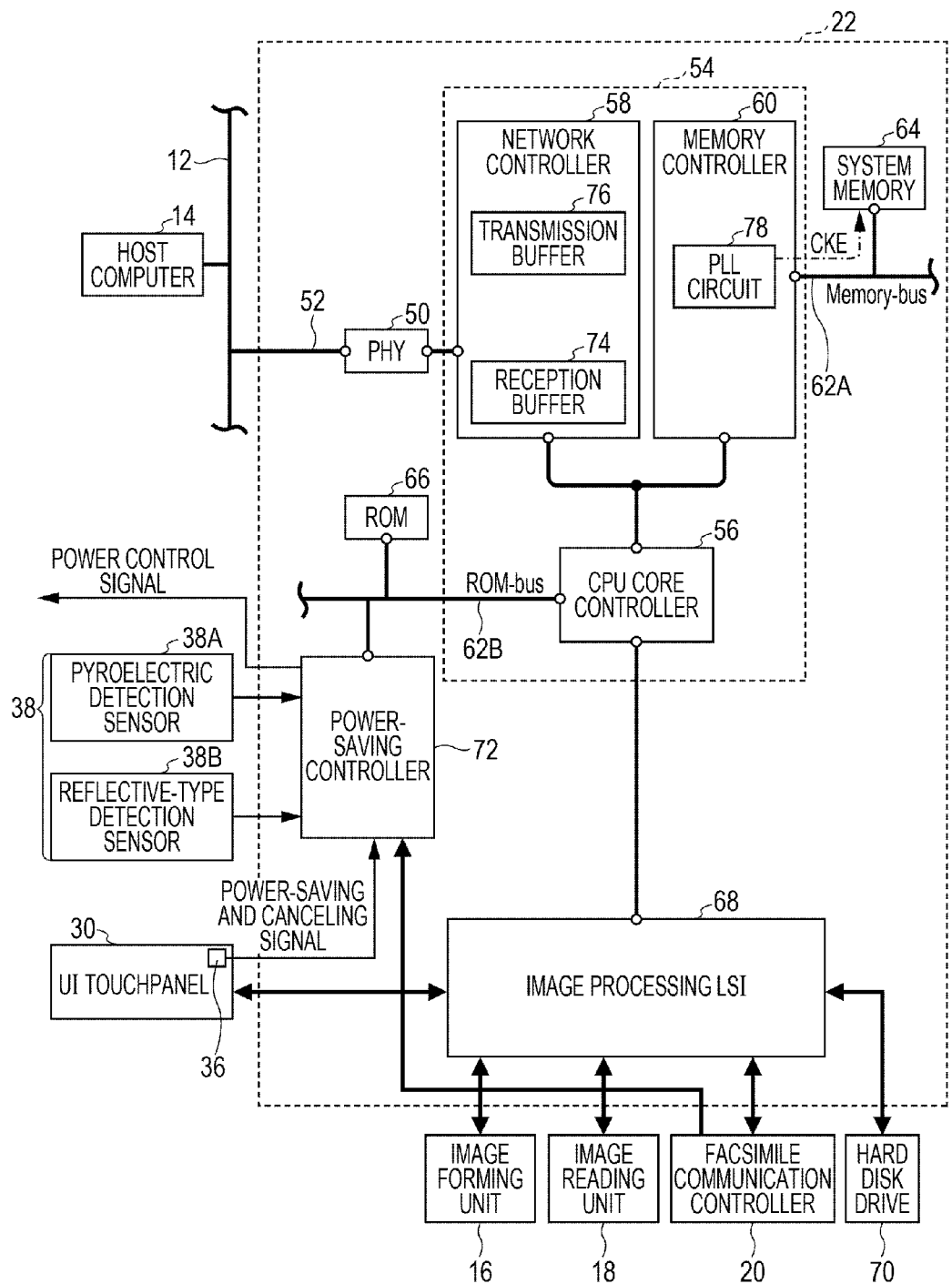
FIG. 3 is a control block diagram of a central controller of the first exemplary embodiment.

FIG. 3 illustrates a hardware configuration of the central controller 22 as a control system of the image processing apparatus 10.

The central controller 22 includes a physical layer (PHY) 50 as a device (IC chip) functioning as a communication interface. The PHY 50 connects a cable 52 (100BASE-T, 1000BASE-T, or the like) to the central controller 22 and converts a received logical signal into an actual electrical signal. The cable 52 serves as a lead-in wire connected to the image processing apparatus 10 in the communication line network 12.

The PHY 50 directly connects the physical cable 52 to the communication line network 12. Alternatively, the PHY 50 may include a wireless device.

The PHY 50 is connected to a central processing unit (CPU) 54 of the central controller 22. The CPU 54 includes CPU core controller 56, network controller 58, and memory controller 60, interconnected in a mutually communicable fashion.

The memory controller 60 in the CPU 54 is connected to a system memory 64 via a memory bus 62A. The CPU core controller 56 is connected to a read-only memory (ROM) 66 via a ROM bus 62B. The CPU core controller 56 is also connected to an image processing LSI 68.

The image processing LSI 68 controls a processor (device) connected to the image processing apparatus 10. The image processing LSI 68 is connected to image forming unit 16, image reading unit 18, facsimile communication controller 20, user interface (UI) touchpanel 30, and hard disk drive (HDD) 70. The UI touchpanel 30 includes a power-saving control button 36. An operation signal of the power-saving control button 36 is sent to a power-saving controller 72 connected to the ROM bus 62B. The power-saving controller 72 is one of the elements continuously supplied with power.

The devices are not limited to those described above, and may include a IC card reader.

The power-saving controller 72 partially suspends the functions of the image processing apparatus 10 so that the image processing apparatus 10 consumes minimum power. For example, the supplying of power to most of the central controller 22 may be occasionally stopped. These power shut-off operations may generally be referred to as a "sleep mode (power-saving mode)."

The power-saving control button 36 may be operated by a user. If the power-saving control button 36 is operated when the image processing apparatus 10 is in a normal power supplied state, the power-saving controller 72 causes some elements and devices including the power-saving controller 72 itself to transition into the sleep mode in which the power supplying is shut off.

If the power-saving control button 36 is operated with the image processing apparatus 10 in the sleep mode, the power-saving controller 72 causes the devices in the sleep mode to transition back into the normal power supplied state.

The sleep mode may be started by a system timer that is activated when an image processing process ends. More specifically, when a predetermined period of time has elapsed since the start of the system timer, the power supplying is shut off. If any operation (such as a hardware key operation) is performed even before the predetermined period of time elapses, the timer counting to the sleep mode is forced to stop. The system timer is started at the end of a next image processing process.

Triggers starting or exiting the sleep mode include not only the operation of the power-saving control button 36 and the starting of the system timer, but also an operation of a human presence sensor 38. The human presence sensors 38 include a pyroelectric detection sensor 38A and the reflective-type detection sensor 38B, different from each other in terms of relative detection range.

The power-saving controller 72 is connected to the pyroelectric detection sensor 38A and the reflective-type detection sensor 38B. If one of the pyroelectric detection sensor 38A and the reflective-type detection sensor 38B detects the presence of a human, the power-saving controller 72 causes the central controller 22 to exit the sleep mode before the power-saving control button 36 is operated by the user. The user may thus use the image processing apparatus 10 early. In accordance with the first exemplary embodiment, the power-saving control button 36 is included while the human presence sensor 38 is optional. Alternatively, the human presence sensor 38 alone may be included for monitoring.

A detection coverage region of the pyroelectric detection sensor 38A (region F of FIGS. 1 and 2) is set to be wider than a detection coverage region of the reflective-type detection sensor 38B (region N of FIG. 1). The pyroelectric detection sensor 38A is continuously powered during the sleep mode. When a moving object is detected by the pyroelectric detection sensor 38A, the power-saving controller 72 starts to power the reflective-type detection sensor 38B. If the reflective-type detection sensor 38B detects the user, some or all devices in the image processing apparatus 10 are set to exit the sleep mode. If the moving object remains undetected until after the elapse of a predetermined period of time from the start of power supplying to the reflective-type detection sensor 38B, the power supplying to the reflective-type detection sensor 38B is shut off.

The CPU core controller 56 performs a CPU function. In accordance with a predetermined program, the CPU core controller 56 controls the operation of the network controller 58, and the memory controller 60. The CPU core controller 56 also controls the image processing LSI 68, thereby controlling the operation of the devices connected to the image processing apparatus 10 (including the image forming unit 16, the image reading unit 18, the facsimile communication controller 20, the UI touchpanel 30, and the hard disk drive 70).

The network controller 58 includes a reception buffer (RX_FIFO) 74 that buffers a communication speed difference during reception, and a transmission buffer (TX_FIFO) 76 that buffers a communication speed difference during transmission. The reception buffer 74 may also be referred to as a buffer 74 operative during reception, and the transmission buffer 76 may also be referred to as a buffer 76 operative during transmission.

The network controller 58 is connected to the PHY 50, and exchanges data (such as image data) with the host computer 14 connected to the communication line network 12.

The memory controller 60 includes a phase-locked loop (PLL) circuit 78 and is connected to the system memory 64. The memory controller 60 receives data received by the network controller 58 and then stores the data onto the system memory 64, or transfers data stored on the system memory 64 to the network controller 58. The memory controller 60 exchanges data not only with the network controller 58 but also with the hard disk drive 70 and the image processing LSI 68.

A processing speed difference occurs between the data exchanging of the memory controller 60 with the system memory 64 and the data exchanging of the network controller 58 with the communication line network 12.

The network controller 58 receives data (such as image data) from the host computer 14 (the communication line network 12) via the PHY 50, and stores the data onto the reception buffer 74 while transferring the data to the memory controller 60 on a first-in first-out (FIFO) basis. The network controller 58 also stores data (such as image data) received from the memory controller 60 onto the transmission buffer 76 while transmitting the data to the host computer 14 (the communication line network 12) via the PHY 50 on a FIFO basis.

Referring to FIG. 3, the control system of the image processing apparatus 10 has been discussed on a per block basis. The discussion focuses on the central controller 22. Each block has the function thereof while each block is independently supplied with or shut off from power during the sleep mode.

Figure 4:
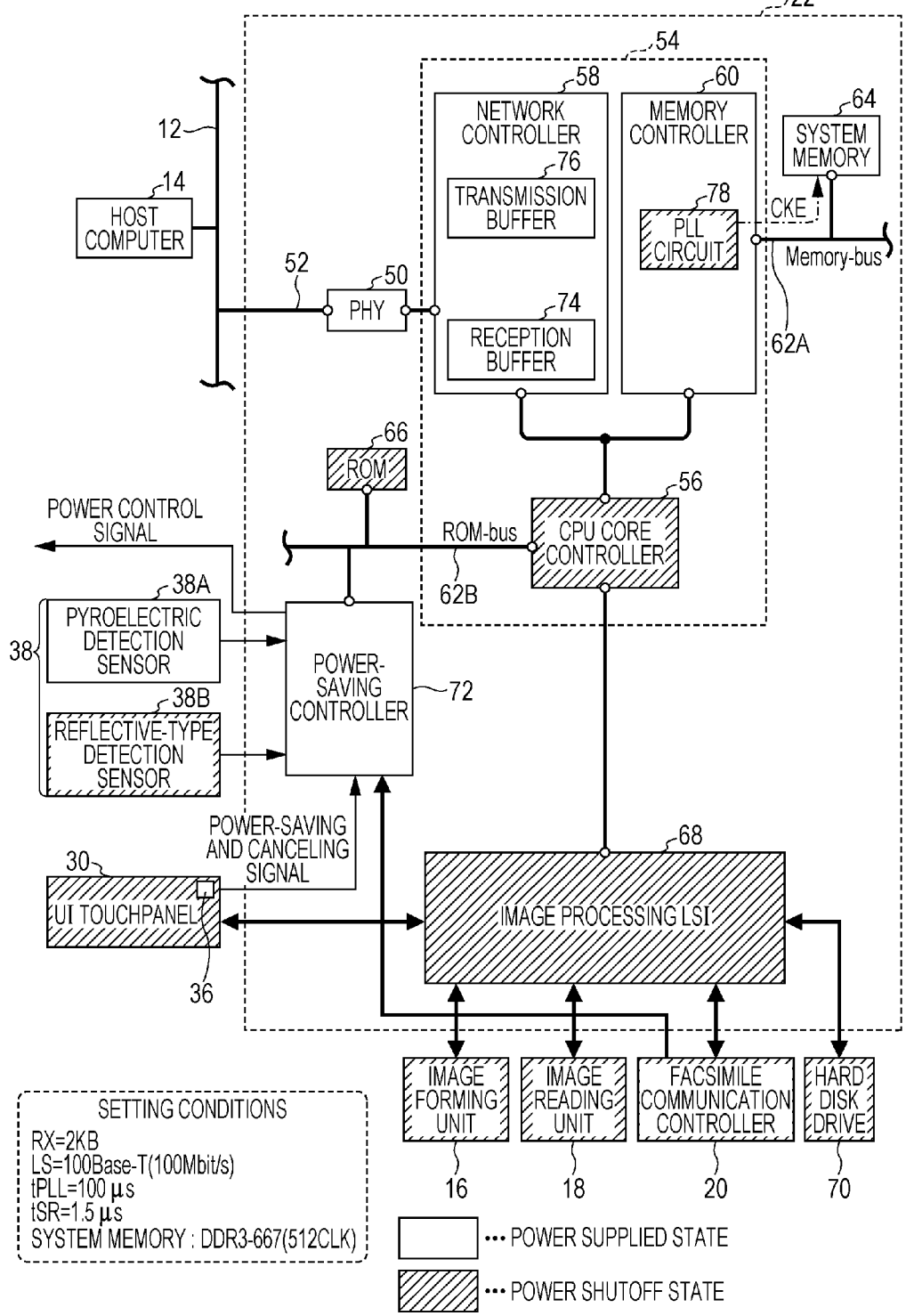
FIG. 4 is a control block diagram illustrating the central controller of FIG. 3 in a sleep mode in with a power supplied section thereof discriminated from a power shutoff section thereof (with PLL off)

As illustrated in FIG. 4, targets to be shut off from power during the sleep mode are denoted by hatched blocks, and include the CPU core controller 56, the PLL circuit 78 in the memory controller 60, the ROM 66, the image processing LSI 68, and the devices (including the image forming unit 16, the image reading unit 18, the UI touchpanel 30, and the hard disk drive 70).

The definition of the power shutoff of the PLL circuit 78 refers to the suspension of the operation thereof (with the oscillation operation thereof suspended). More specifically, in response to a power shutoff instruction, the PLL circuit 78 is continuously supplied with power but suspends the operation thereof (with the oscillation operation) suspended) with no or minimum power consumed. The oscillation suspended state allows the PLL circuit 78 to start up earlier, in particular with tPLL=100 μs, than the power shutoff state does.

The blocks (unhatched blocks in FIG. 4) other than the above-described blocks are continuously supplied with power even during the sleep mode. For example, the network controller 58 quickly responds to a print instruction from a remote host computer 14. As described above, the power-saving controller 72 monitors the operational state of the power-saving control button 36 and the moving object detection state of the human presence sensor 38.

When the network controller 58 receives the data from the host computer 14 via the communication line network 12, the data are temporarily stored on the system memory 64. Since the PLL circuit 78 in the memory controller 60 is in the power shutoff state during the sleep mode, the system memory 64 is unable to store the data until the PLL circuit 78 resumes the operation thereof.

The system memory 64 has a self-refreshing function. More specifically, the system memory 64 becomes operative in response to the reception of a self-refreshing release instruction signal that is output by the memory controller 60 after the PLL circuit 78 resumes the operation thereof from the sleep mode. A rise time follows the reception of the self-refreshing release instruction signal. The rise time is different depending on the type of the system memory (double data rate 2 (DDR2) SDRAM or DDR3 SDRAM).

The first exemplary embodiment is based on the premise that the central controller 22 receives data from the host computer 14 during the sleep mode. In the first exemplary embodiment, the control mechanism of the central controller 22 during or at the exit of the sleep mode is set up in accordance with condition parameters 1 through 4 automatically determined by an existing system configuration.

Condition parameter 1: Storage capacity RX (KB) of the reception buffer 74

Condition parameter 2: Link speed LS (Mbit) of a communication line determined by the cable 52 and the like connected to the PHY 50

Condition parameter 3: Time from when the PLL circuit 78 starts to access the system memory 64 to when the PLL circuit 78 resumes the operation thereof (rise time) tPLL (μs)

Condition parameter 4: Time from when the system memory 64 receives the self-refreshing release instruction signal to when the system memory 64 resumes the operation thereof (rise time) tSR (μs).

If the condition parameter 1 and the condition parameter 2 are determined, time tFULL the reception buffer 74 takes before reaching the full state thereof is calculated by equation (1):

$$tFULL(\mu s)=\{RX(KB)\times 8\}/LS(Mbit) \quad (1)$$

Time tSM (μs) the system memory 64 takes to resume the operation is determined by the condition parameter 3 and the condition parameter 4 as represented by equation (2):

$$tSM(\mu s)=tPLL(\mu s)+tSR(\mu s) \quad (2)$$

In comparison with the condition parameters 1, 3, and 4, the condition parameter 2 varies depending on the environment and configuration of the communication line network 12 where the image processing apparatus 10 is installed.

In the first exemplary embodiment, the sleep mode is set up such that time tSM (μs) calculated by equation (2) is shorter than time tFULL calculated by equation (1) as represented by equation (3):

$$tFULL(\mu s) > tSM(\mu s) \quad (3)$$

In the first exemplary embodiment, the storage capacity of the reception buffer 74 is not excessively increased from the standpoint that both the power-saving feature and convenience are pursued at the same time. An increase in the storage capacity of the reception buffer 74 leads to a bulky structure in physical design (more memory cells).

In the first exemplary embodiment, a sacrifice involved in the implementation of the power-saving feature is minimized during the sleep mode by determining whether the condition of equation (3) is satisfied or not.

More specifically, whether or not to supply the PLL circuit 78 with power during the sleep mode is set.

The PLL circuit 78 consumes a large amount of power among the elements forming the central controller 22. To increase the power-saving effect, the PLL circuit 78 is desirably shut off from power during the sleep mode (see FIG. 4). However, time tPLL (rise time) from when the PLL circuit 78 starts to access the system memory 64 to when the PLL circuit 78 resumes the operation thereof greatly affects time tSM the system memory 64 takes to resume the operation.

Whether or not to supply the PLL circuit 78 with power is determined in comparison with time tFULL before the reception buffer 74 becomes full. The determination result in FIG. 5 indicates that the PLL circuit 78 is to be supplied with power.

The features of the first exemplary embodiment are described below.

The image processing apparatus 10 transitions into the sleep mode if no operation is performed. In the first exemplary embodiment, at least the power-saving controller 72 is supplied with power.

If any rise trigger is input, the image processing apparatus 10 transitions into a warmup mode.

The rise triggers may include a signal or information responsive to the detection results of a second human presence sensor 30. The operation of the power-saving control button 36 by the user may also serve as a rise trigger.

Among the modes, the warmup mode consumes a maximum amount of power in order to cause the image processing apparatus 10 to be back quickly to a process enable state. For example, an infrared heater, if used in the fixing module, renders a warmup mode time shorter than a halogen lamp heater.

Upon completing a warmup operation in the warmup mode, the image processing apparatus 10 transitions into a standby mode.

The standby mode is a ready-to-operate mode. The image processing apparatus 10 is enabled to perform the image processing process immediately.

In response to a job execution operation entered as a key input, the image processing apparatus 10 transitions into a running mode, and performs the image processing process in response to the specified job.

When the image processing process is complete (when all the jobs are completed if multiple consecutive jobs have been on standby), the image processing apparatus 10 transitions into the standby mode in response to a standby trigger. Alternatively, the system timer starts counting subsequent to the end of the image processing process, the standby trigger is output after the elapse of a predetermined period of time, and the image processing apparatus 10 transitions into the standby mode.

If a job execution instruction is provided during the standby mode, the image processing apparatus 10 transitions back into the running mode again. If a fall trigger is detected, or if a predetermined period of time has elapsed, the image processing apparatus 10 transitions into the sleep mode.

The fall triggers may include a signal or information responsive to the detection results of the second human presence sensor 30. The system timer may also be used in combination with the fall trigger.

The transitions of the modes of the image processing apparatus 10 are not necessarily performed as in the time series order described herein. For example, the image processing apparatus 10 may quit a process in the standby mode subsequent to the warmup mode, and may then transition into the sleep mode.

As described above, if the predetermined period of time has elapsed with no job to be processed at hand, the image processing apparatus 10 transitions into the sleep mode. During the sleep mode, power supplying is shut off to the central controller 22 and the devices (including the image forming unit 16, the image reading unit 18, the UI touchpanel 30, and the hard disk drive 70) other than the facsimile communication controller 20 in the image processing apparatus 10.

In the central controller 22 during the sleep mode, power is shut off to the CPU core controller 56 and the ROM 66 in the central controller 22 but the network controller 58 remains continuously supplied with power because the network controller 58 is to be ready to receive data via the communication line network 12.

In principle, the memory controller 60 is supplied with power during the sleep mode. However, whether or not to supply power to the PLL circuit 78 that consumes power most is determined during the sleep mode in response to the result of equation (3) calculated in accordance with the conditions parameters 1 through 4.

In the first exemplary embodiment, whether or not to supply power to the PLL circuit 78 in the memory controller 60 is determined in the transition into the sleep mode based on the condition parameter 1 that is the storage capacity RX of the reception buffer 74 and the condition parameter 2 that is the link speed LS of the communication line network 12 gotten from a register in the PHY 50.

Figure 5:
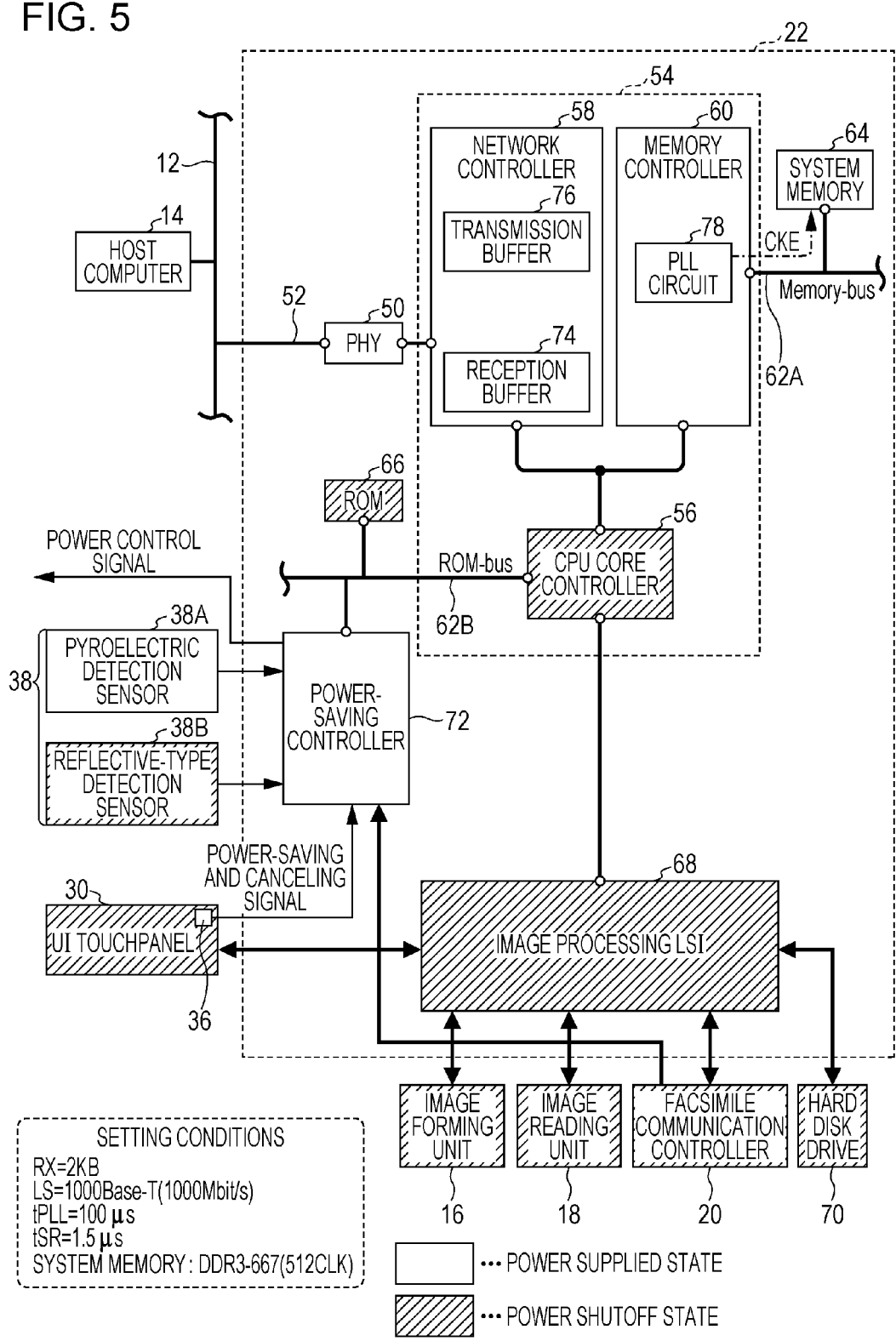
FIG. 5 is a control block diagram illustrating the central controller of FIG. 3 in a sleep mode with a power supplied section thereof discriminated from a power shutoff section thereof (with PLL on)

If the result indicates that equation (3) holds, power is shut off to the PLL circuit 78 as illustrated in FIG. 4 when the image processing apparatus 10 is transitioned into the sleep mode. If equation (3) does not hold, power is continuously supplied to the PLL circuit 78 as illustrated in FIG. 5 when the image processing apparatus 10 transitions into the sleep mode.

If the storage capacity RX of the reception buffer 74 is 2 KB and the link speed LS is 100BASE-T (100 Mbit/s) as illustrated in FIG. 4, solution tFULL (µs) of equation (1) is as follows:

$$tFULL(\mu s)=\{2K\times 8\}/100=163.84\ \mu s$$

If time tPLL as the condition parameter 3 is 100 µs, and time tSR as the condition parameter 4 is 1.5 µs, solution tSM of equation (2) is as follows:

$$tSM(\mu s)=100+1.5=101.5\ \mu s$$

Figure 6:
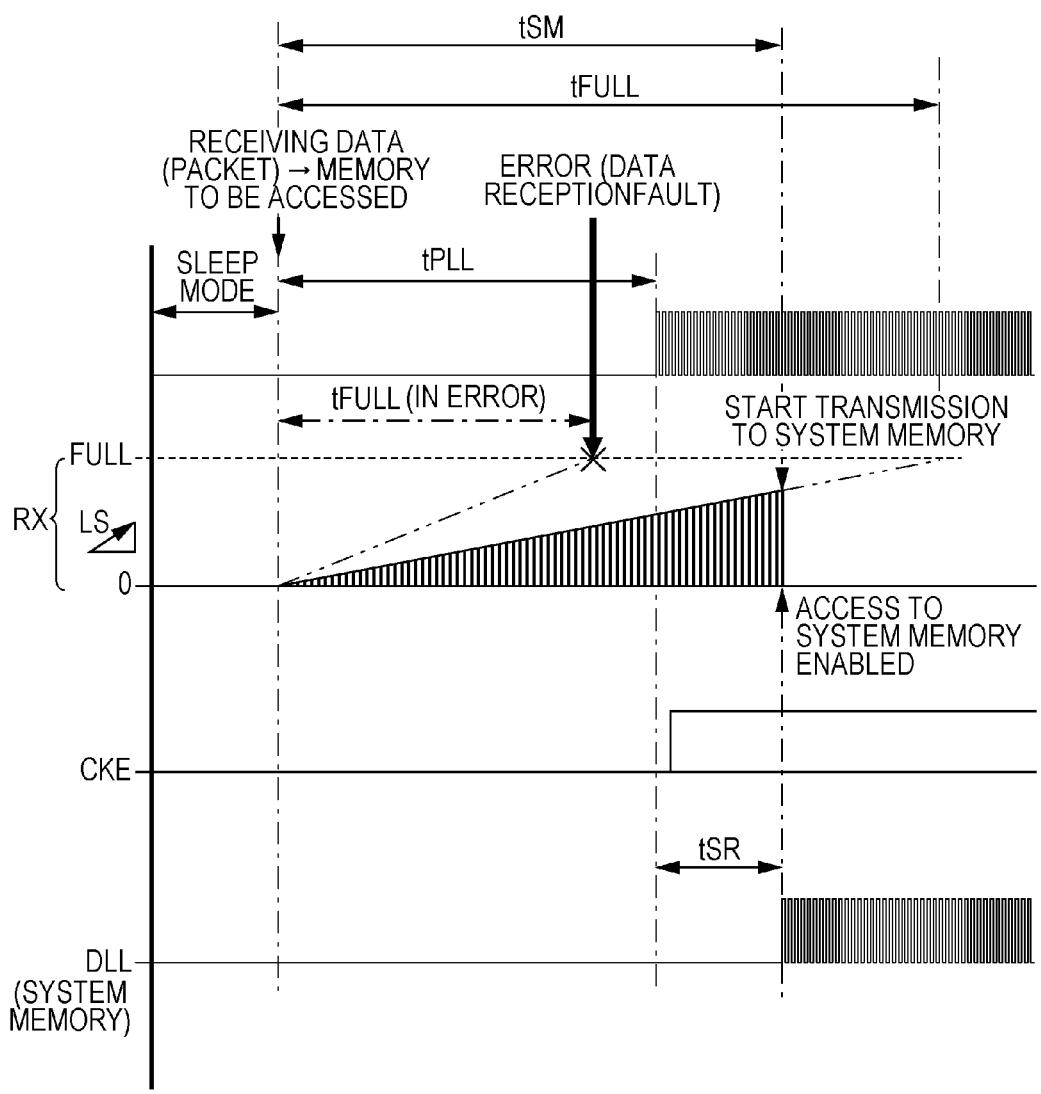
FIG. 6 is a timing diagram of a startup of the central controller in the sleep mode at data reception in accordance with the first exemplary embodiment.

The determination of equation (3) indicates that tFULL>tSM holds as described with reference to a timing diagram of FIG. 6, and thus equation (3) holds. Data are reliably stored on the system memory 64 in response to the reception of the data via the communication line network 12 even if the PLL circuit 78 is shut off from power during the sleep mode.

If the storage capacity RX of the reception buffer 74 is 2 KB and the link speed LS is 1000BASE-T (1000 Mbit/s) as illustrated in FIG. 5, solution tFULL (µs) of equation (1) is as follows:

$$tFULL(\mu s)=\{2K\times 8\}/1000=16.384\ \mu s$$

If time tPLL as the condition parameter 3 is 100 µs, and time tSR as the condition parameter 4 is 1.5 µs, solution tSM of equation (2) is as follows:

$$tSM(\mu s)=100+1.5=101.5\ \mu s$$

The determination of equation (3) indicates that tFULL<tSM holds as described with reference to the timing diagram of FIG. 6, and equation (3) does not hold.

The PLL circuit 78 is not shut off from power and remains continuously supplied with power.

According to the first exemplary embodiment, the central controller 22 includes the memory controller 60 and the network controller 58. The memory controller 60, including the PLL circuit 78 that generates a clock signal, controls writing information to and reading information from the system memory 64 in accordance with the clock signal. The network controller 58 controls exchanging of information between the memory controller 60 and the communication line network 12 and includes the reception buffer 74 that temporarily stores the information. The central controller 22 may receive the information via the communication line network 12 during the sleep mode.

Whether to continue or shut off supplying power to the PLL circuit 78 during the sleep mode is predetermined by referencing time tFULL the reception buffer 74 takes before reaching the full state thereof, and time tSM the system memory 64 takes before being enable to store the information stored on the reception buffer 74. This arrangement controls reception delay.

Second Exemplary Embodiment

A second exemplary embodiment is described with reference to FIGS. 7 through 9. In the discussion of the second exemplary embodiment, elements identical to those described with reference to the first exemplary embodiment are designated with the same reference numerals, and the discussion thereof is omitted.

Figure 8:
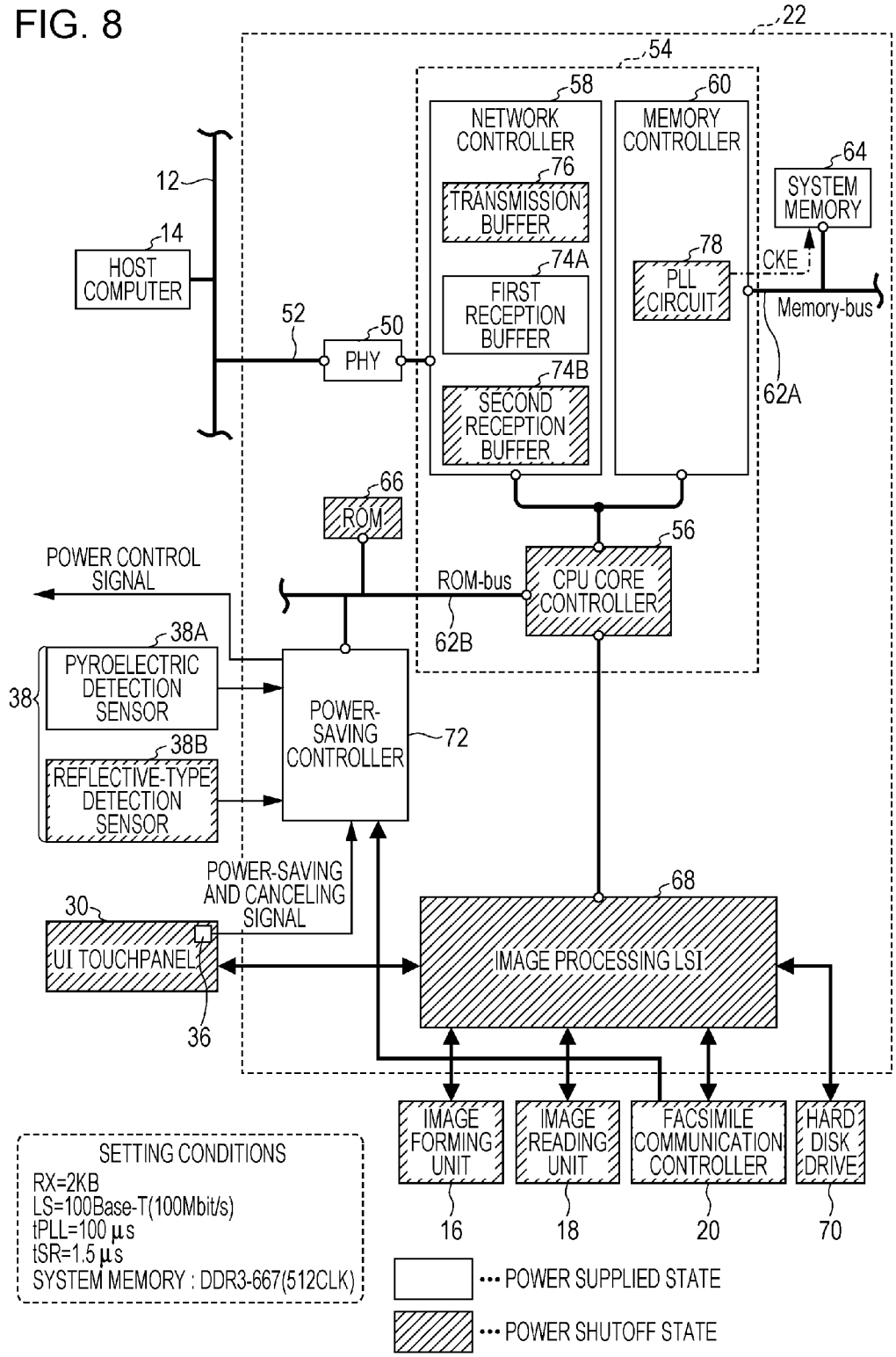
FIG. 8 is a control block diagram illustrating the central controller of FIG. 7 with a power supplied section thereof discriminated from a power shutoff section thereof (low-capacity buffer)
Figure 9:
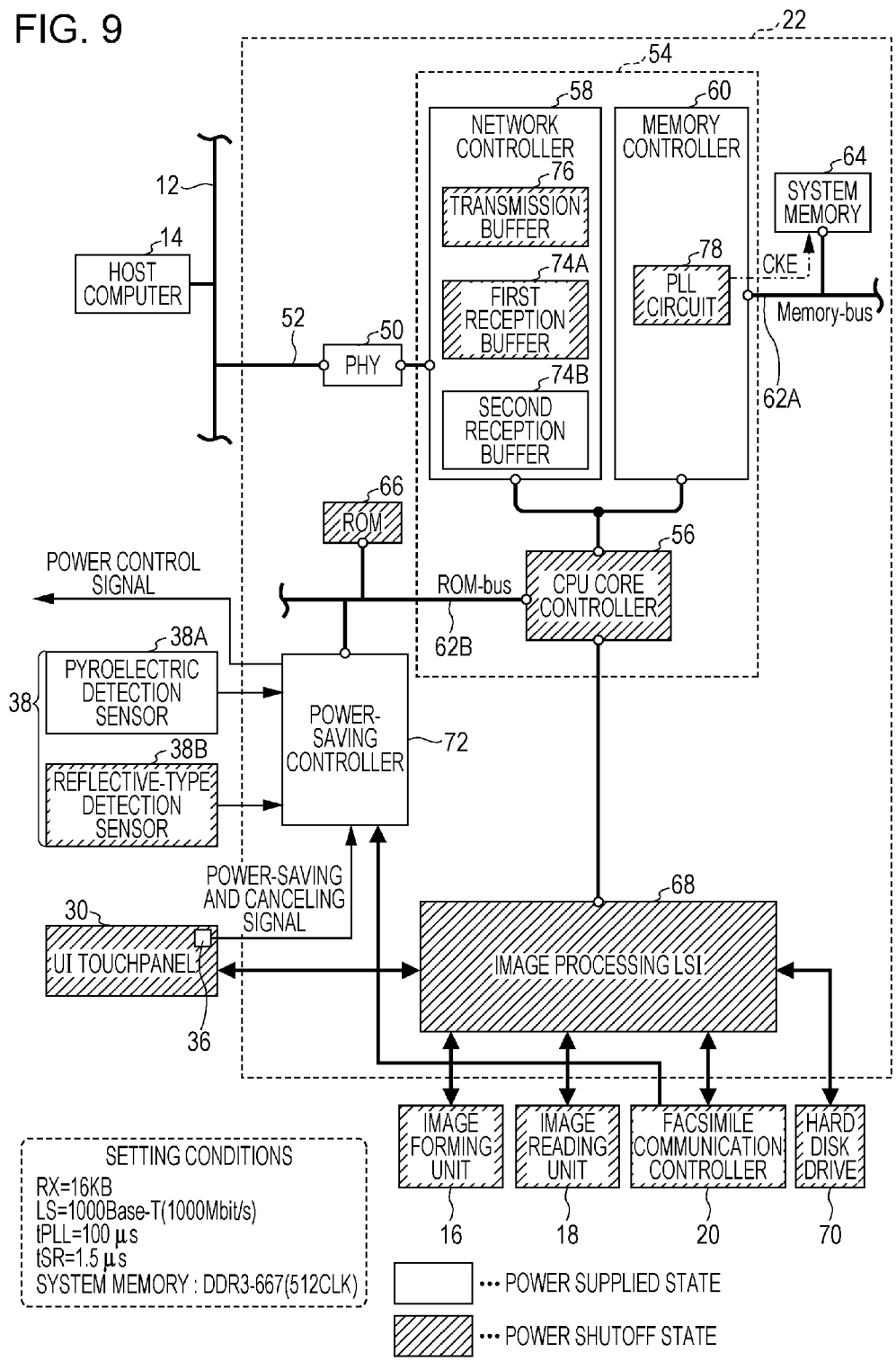
FIG. 9 is a control block diagram illustrating the central controller of FIG. 7 with a power supplied section thereof discriminated from a power shutoff section thereof (high-capacity buffer)

For a high power-saving efficiency, the PLL circuit 78 is desirably in a power shutoff state during the sleep mode because the PLL circuit 78 consumes high power among the elements forming the central controller 22 (see FIGS. 8 and 9). However, time tPLL (rise time) from when the PLL circuit 78 starts to access the system memory 64 to when the PLL circuit 78 resumes the operation thereof greatly affects time tSM the system memory 64 takes to resume the operation thereof.

In view of a high power-saving effect of the PLL circuit 78, the PLL circuit 78 is shut off from power during the sleep mode or the oscillation operation thereof is suspended during the sleep mode. Multiple reception buffers 74A and 74B different in storage capacity may be arranged. The first reception buffer 74A, and the second reception buffer 74B may be used alone or in combination in accordance with the link speed LS of the communication line determined by the cable 52 connected to the PHY 50.

The feature of the second exemplary embodiment is that the PLL circuit 78 in the memory controller 60 is shut off from power or stops oscillating when the image processing apparatus 10 transitions into the sleep mode.

Figure 7:
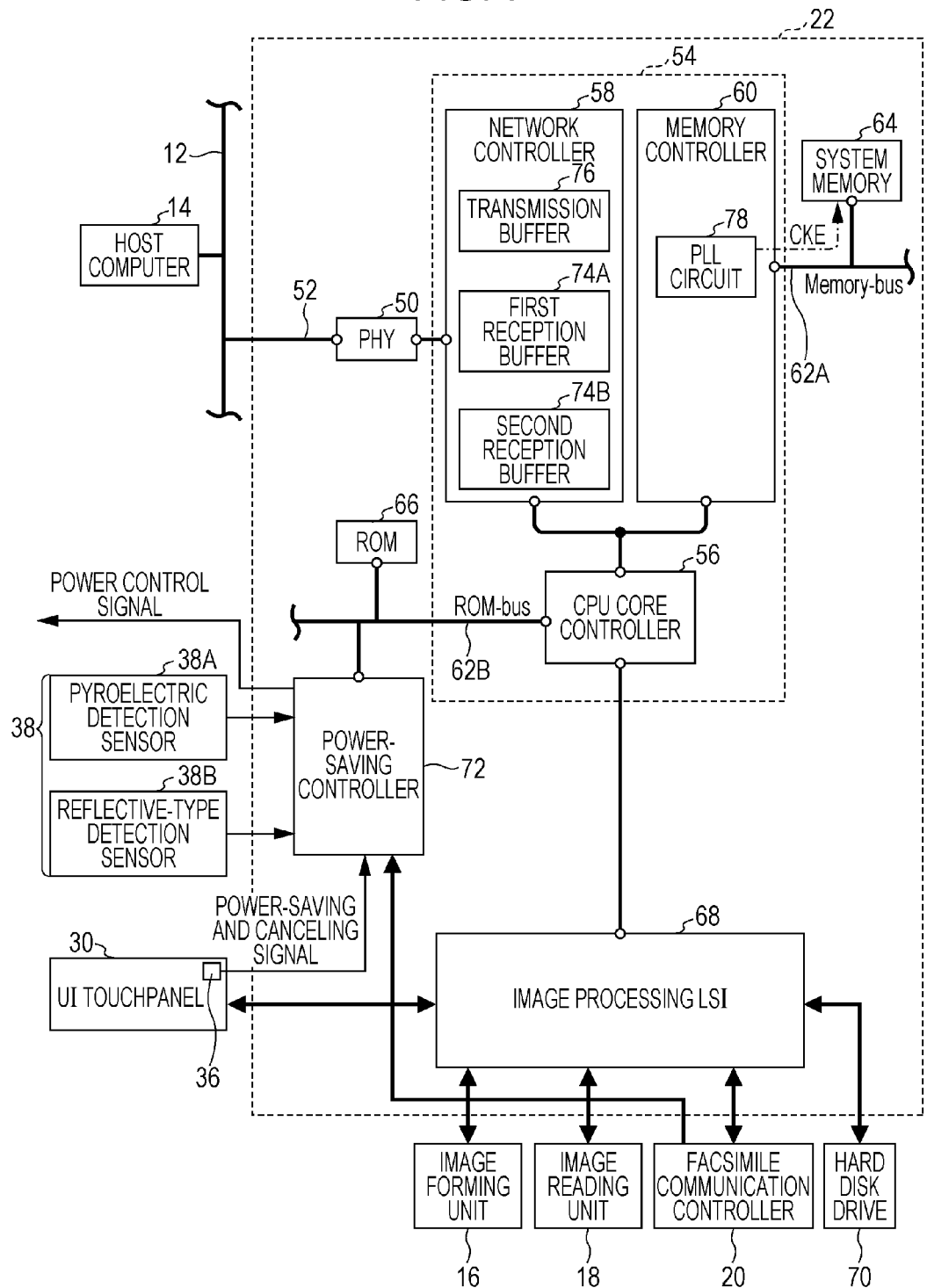
FIG. 7 is a control block diagram of the central controller of a second exemplary embodiment.

As illustrated in FIG. 7, the network controller 58 includes two reception buffers 74A and 74B.

The first reception buffer 74A has a storage capacity RX(A) of 2 KB. The second reception buffer 74B has a storage capacity RX of 16 KB. Those buffers are supplied with or shut off from power independent of each other.

Whether the condition of equation (3) is satisfied or not is determined based on the condition parameter 1 that is the storage capacity RX of the reception buffer 74 and the condition parameter 2 that is the link speed LS of the communication line network 12 gotten from the register in the PHY 50.

If the determination result indicates that equation (3) holds, the data reception via the communication line network 12 is not affected during the sleep mode even with the second reception buffer 74B shut off from power in the transition into the sleep mode as illustrated in FIG. 8. If equation (3) does not hold, the second reception buffer 74B is continuously supplied with power in the transition into the sleep mode as illustrated in FIG. 9. The first reception buffer 74A is shut off from power. Alternatively, the first reception buffer 74A may be continuously supplied with power.

If the storage capacity RX(A) of the reception buffer 74A is 2 KB and the link speed LS is 100BASE-T (100 Mbit/s) as illustrated in FIG. 8, solution tFULL (µs) of equation (1) is as follows:

$$tFULL(\mu s)=\{2K\times 8\}/100=163.84\ \mu s$$

If time tPLL as the condition parameter 3 is 100 µs, and time tSR as the condition parameter 4 is 1.5 µs, solution tSM of equation (2) is as follows:

$$tSM(\mu s)=100+1.5=101.5\ \mu s$$

The determination of equation (3) indicates that tFULL>tSM holds as described with reference to the timing diagram of FIG. 6. The use of the second reception buffer 74B is unnecessary, and the second reception buffer 74B is shut off from power in the transition into the sleep mode. If data are received via the communication line network 12 during the sleep mode, the system memory 64 is enabled to store the data even with the PLL circuit 78 shut off from power.

If the storage capacity RX(A) of the reception buffer 74A is 2 KB and the link speed LS is 1000BASE-T (1000 Mbit/s) as illustrated in FIG. 9, solution tFULL (µs) of equation (1) is as follows:

$$tFULL(\mu s)=\{2K\times 8\}/1000=16.384\ \mu s$$

If time tPLL as the condition parameter 3 is 100 μs, and time tSR as the condition parameter 4 is 1.5 μs, solution tSM of equation (2) is as follows:

$$tSM(\mu s)=100+1.5=101.5\ \mu s$$

The determination of equation (3) indicates that tFULL<tSM holds as described with reference to the timing diagram of FIG. 6, and equation (3) does not hold.

Time tFULL is recalculated using the storage capacity RX(B) of the second reception buffer 74B.

$$tFULL(\mu s)=\{16K\times 8\}/1000=131.10\ \mu s$$

The determination of equation (3) indicates that tFULL>tSM holds. The second reception buffer 74B is supplied with power in the transition into the sleep mode. If data are received via the communication line network 12, the system memory 64 is enabled to store the data even with the PLL circuit 78 shut off from power. The first reception buffer 74A may be shut off from power.

Third Exemplary Embodiment

A third exemplary embodiment is described with reference to FIGS. 10 through 12. In the discussion of the third exemplary embodiment, elements identical to those described with reference to the first embodiment are designated with the same reference numerals, and the discussion thereof is omitted.

Figure 11:
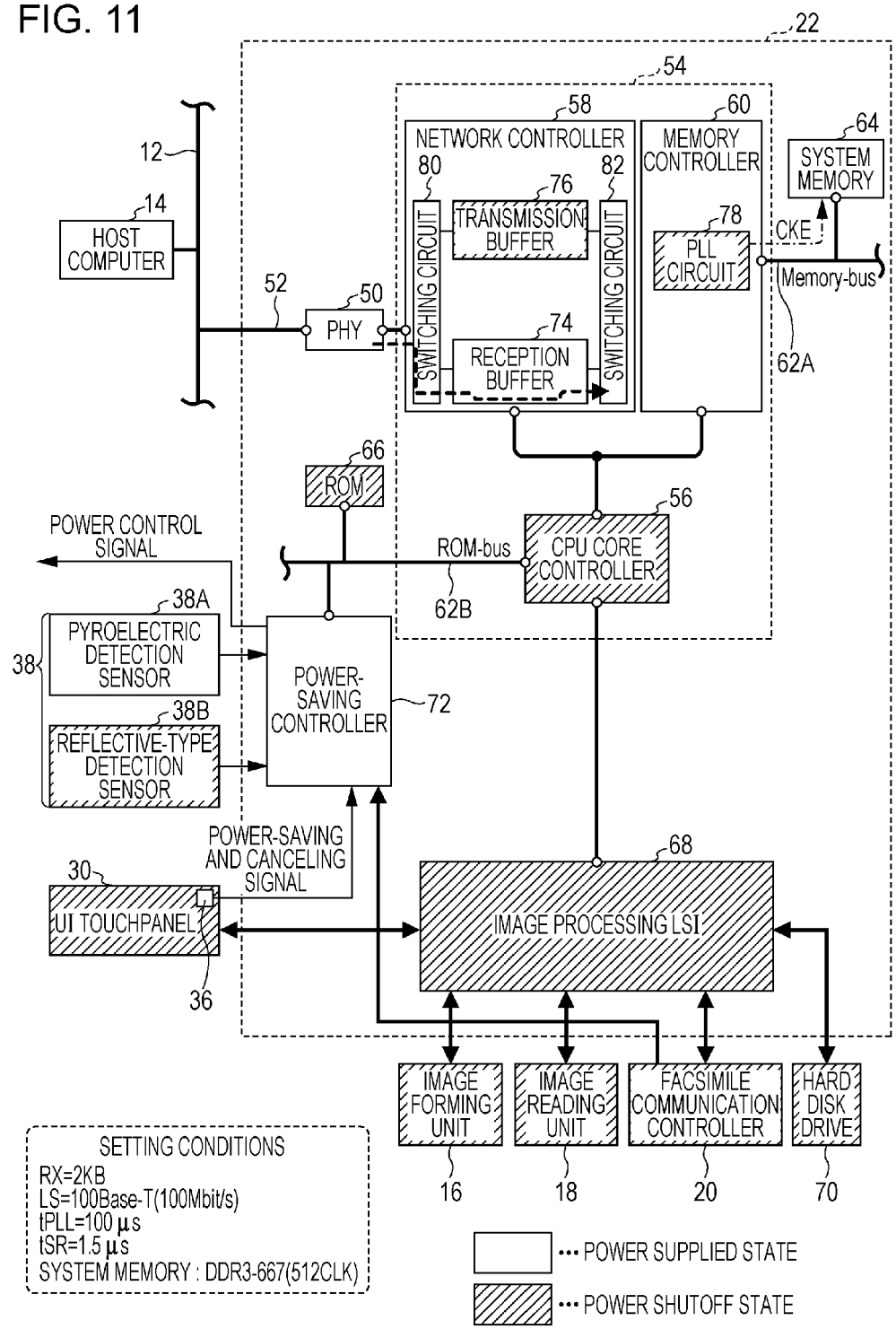
FIG. 11 is a control block diagram illustrating the central controller of FIG. 10 with a power supplied section thereof discriminated from a power shutoff section thereof (with a transmission buffer unused)
Figure 12:
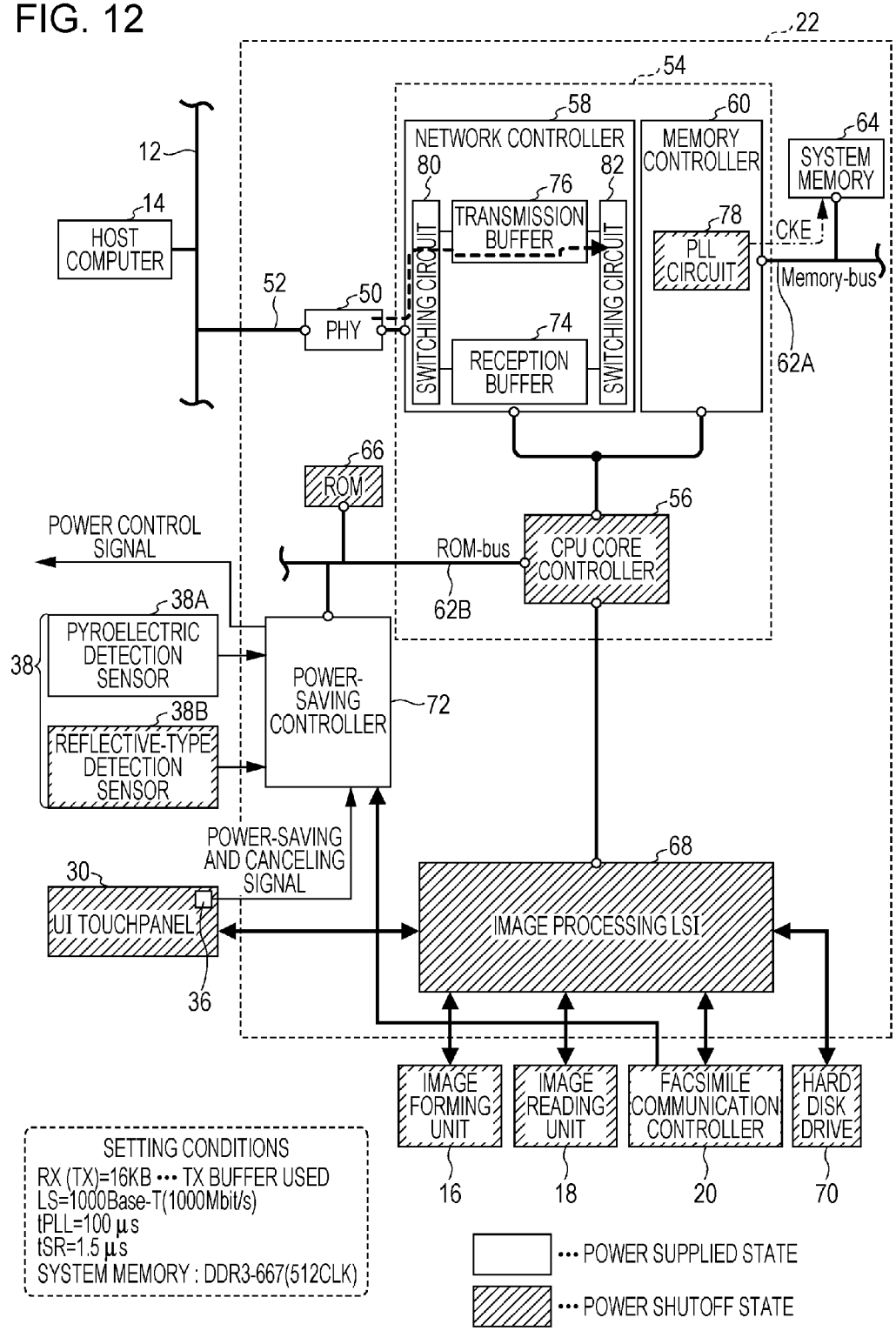
FIG. 12 is a control block diagram illustrating the central controller of FIG. 10 with a power supplied section thereof discriminated from a power shutoff section thereof (with the transmission buffer used).

For a high power-saving efficiency, the PLL circuit 78 is desirably to be set in a power shutoff state during the sleep mode because the PLL circuit 78 consumes high power among the elements forming the central controller 22 (see FIGS. 11 and 12). However, time tPLL (rise time) from when the PLL circuit 78 starts to access the system memory 64 to when the PLL circuit 78 resumes the operation thereof greatly affects time tSM the system memory 64 takes to resume the operation thereof.

In view of a high power-saving effect of the PLL circuit 78, the PLL circuit 78 is shut off from power during the sleep mode or the oscillation operation thereof is suspended during the sleep mode. In addition, the transmission buffer 76 may be used as a second reception buffer temporarily in order to render time tFULL longer than time tFULL of the single reception buffer 74.

The feature of the third exemplary embodiment is that the PLL circuit 78 in the memory controller 60 is shut off from power or the oscillation operation thereof is suspended in the transition into the sleep mode.

Figure 10:
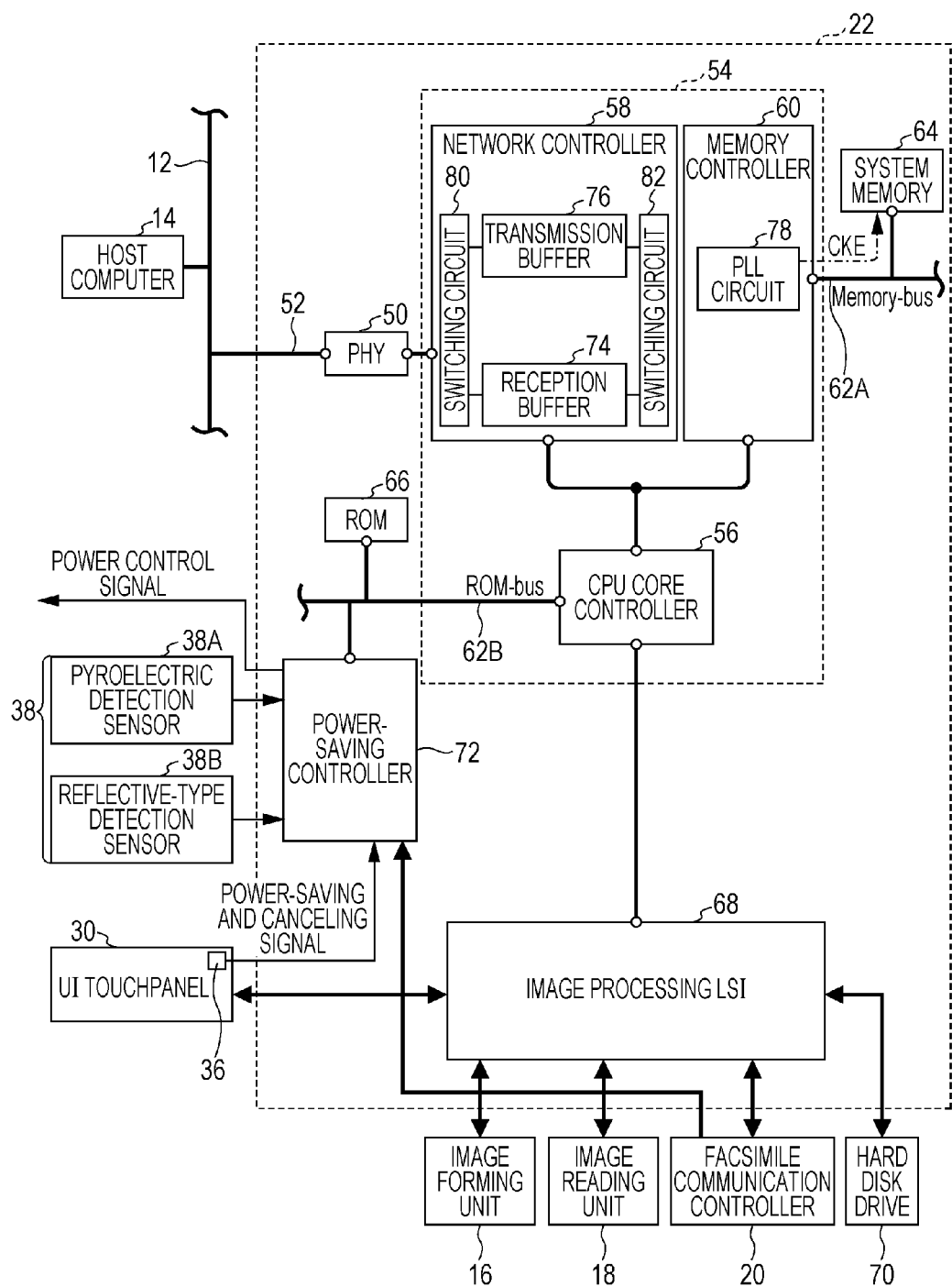
FIG. 10 is a control block diagram of a central controller of a third exemplary embodiment.

As illustrated in FIG. 10, a switching circuit 80 is connected downstream of the transmission buffer 76 and upstream of the reception buffer 74, both arranged in the network controller 58, and a switching circuit 82 is connected to downstream of the reception buffer 74 and upstream of the transmission buffer 76. The transmission buffer 76 is thus used as a reception buffer storage unit as appropriate.

The reception buffer 74 has a storage capacity RX of 2 KB. The transmission buffer 76 has a storage capacity TX of 16 KB. Those buffers are supplied with or shut off from power independent of each other.

Whether the condition of equation (3) is satisfied or not is determined based on the condition parameter 1 that is the storage capacity RX of the reception buffer 74 and the condition parameter 2 that is the link speed LS of the communication line network 12 gotten from the register in the PHY 50.

If the determination result indicates that equation (3) holds, the data reception via the communication line network 12 is not affected during the sleep mode even with the transmission buffer 76 shut off from power in the transition into the sleep mode as illustrated in FIG. 11. If equation (3) does not hold, the transmission buffer 76 is continuously supplied with power in the transition into the sleep mode as illustrated in FIG. 12.

If the storage capacity RX of the reception buffer 74 is 2 KB and the link speed LS is 100BASE-T (100 Mbit/s) as illustrated in FIG. 11, solution tFULL (μs) of equation (1) is as follows:

$$tFULL(\mu s)=\{2K\times 8\}/100=163.84\ \mu s$$

If time tPLL as the condition parameter 3 is 100 μs, and time tSR as the condition parameter 4 is 1.5 μs, solution tSM of equation (2) is as follows:

$$tSM(\mu s)=100+1.5=101.5\ \mu s$$

The determination of equation (3) indicates that tFULL>tSM holds as described with reference to the timing diagram of FIG. 6. The use of the transmission buffer 76 is unnecessary, and the transmission buffer 76 is shut off from power in the transition into the sleep mode. If data are received via the communication line network 12 during the sleep mode, the system memory 64 is enabled to store the data even with the PLL circuit 78 shut off from power.

If the storage capacity RX(A) of the reception buffer 74 is 2 KB and the link speed LS is 1000BASE-T (1000 Mbit/s) as illustrated in FIG. 12, solution tFULL (μs) of equation (1) is as follows:

$$tFULL(\mu s)=\{2K\times 8\}/1000=16.384\ \mu s$$

If time tPLL as the condition parameter 3 is 100 μs, and time tSR as the condition parameter 4 is 1.5 μs, solution tSM of equation (2) is as follows:

$$tSM(\mu s)=100+1.5=101.5\ \mu s$$

The determination of equation (3) indicates that tFULL<tSM holds as described with reference to the timing diagram of FIG. 6, and equation (3) does not hold.

Time tFULL is recalculated using the storage capacity TX of the transmission buffer 76 (to be used as the storage capacity RX).

$$tFULL(\mu s)=\{16K\times 8\}/1000=131.10\ \mu s$$

The determination of equation (3) indicates that tFULL>tSM holds. The transmission buffer 76 is supplied with power in the transition into the sleep mode. If data are received via the communication line network 12, the system memory 64 is enabled to store the data even with the PLL circuit 78 shut off from power. The reception buffer 74 may be shut off from power.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A power supplying control apparatus comprising:
a transition unit configured to cause a control apparatus to transition to one of a power supplied state that causes power to be supplied and a power shutoff state that shuts off the supplying of power, the control apparatus including:

a first memory control unit including a reference signal generator configured to generate a reference signal serving as a reference of a control operation, the first memory control unit being configured to write information to or read information from a first memory in response to the reference signal, and a communication line network control unit configured to control communications with a communication line network, the communication line network control unit including a second memory configured to temporarily store information, the second memory serving as a buffer between a transmission and reception speed of information from the communication line network and a processing speed of the first memory control unit operating in response to the reference signal; and a determining unit configured to determine a transition target of the transition unit in accordance with a first time period and a second time period, the first time period having a length of time beyond which no further memory space is available from the second memory, and thus being determined by the transmission and reception speed of the information to the communication line network and the storage capacity of the second memory, the second time period being so long as to enable the information stored on the second memory in the power shutoff state to be stored on the first memory via the first memory control unit.

2. The power supplying control apparatus according to claim 1, wherein the determining unit comprises a reference signal generation control unit configured to shut off power supplied to the reference signal generator in response to a power shutoff instruction from the transition unit if the first time period is longer than the second time period, and to continue supplying power to the reference signal generator in response to the power shutoff instruction from the transition unit if the first time period is shorter than the second time period.

3. The power supplying control apparatus according to claim 1, wherein in response to the power shutoff instruction, the reference signal generator continues to be supplied with power and transitions into an operation disabled state that consumes no or minimum power.

4. The power supplying control apparatus according to claim 2, wherein in response to the power shutoff instruction, the reference signal generator continues to be supplied with power and transitions into an operation disabled state that consumes no or minimum power.

5. The power supplying control apparatus according to claim 1, wherein the first memory has an information retaining function to retain information that has been stored every predetermined time interval.

6. The power supplying control apparatus according to claim 2, wherein the first memory has an information retaining function to retain information that has been stored every predetermined time interval.

7. The power supplying control apparatus according to claim 3, wherein the first memory has an information retaining function to retain information that has been stored every predetermined time interval.

8. The power supplying control apparatus according to claim 4, wherein the first memory has an information retaining function to retain information that has been stored every predetermined time interval.

9. The power supplying control apparatus according to claim 1, wherein in response to the second time period being less than the first time period, the reference signal generator enters the power shutoff state.

10. The power supplying control apparatus according to claim 9, wherein in response to the second time period being greater than the first time period, the reference signal generator does not enter the power shutoff state.

11. A management control apparatus comprising:

a first memory control unit that includes a reference signal generator configured to generate a reference signal and, in response to the reference signal, the first memory control unit controls writing and reading of information on a first memory; and a communication line network control unit configured to control an exchanging of information between the first memory control unit and a communication line network, the communication line network control unit including a second memory configured to stores the information, wherein the management control apparatus manages a plurality of processors connected thereto such that the processors perform a process in coordination with each other, and wherein the management control apparatus is configured to determine whether to continue or shut off power supplied to the reference signal generator in response to a power shutoff instruction depending on a comparison result of a first time period and a second time period, the first time period having a length of time beyond which no further memory space is available from the second memory, and thus determined by a transmission and reception speed of information to the communication line network and a storage capacity of the second memory, the second time period being so long as to enable the information stored on the second memory to be stored on the first memory at a rise from a power shutoff state.

12. The management control apparatus according to claim 11, wherein in response to the power shutoff instruction, the reference signal generator continues to be supplied with power and transitions into an operation disabled state that consumes no or minimum power.

13. An image processing apparatus that processes an image in a coordination fashion in response to an instruction from a user, the image processing apparatus comprising:

a power supplying control apparatus including a transition unit configured to cause a control apparatus to transition to one of a power supplied state that causes power to be supplied and a power shutoff state that shuts off the supplying of power, the control apparatus including:

a first memory control unit including a reference signal generator configured to generate a reference signal serving as a reference of a control operation, the first memory control unit being configured to write information to or read information from a first memory in response to the reference signal, and a communication line network control unit configured to control communications with a communication line network, the communication line network control unit including a second memory configured to temporarily stores information, the second memory serving as a buffer between a transmission and reception speed of information from the communication line network and a processing speed of the first memory control unit operating in response to the reference signal; and a determining unit configured to determine a transition target of the transition unit in accordance with a first time period and a second time period, the first time period having a length of time beyond which no further memory space is available from the second memory, and thus being determined by the transmission and reception speed of the information to the communication line network and the storage capacity of the second memory, the second time period being so long as to enable the information stored on the second memory in the power shutoff state to be stored on the first memory via the first memory control unit, wherein the image processing apparatus further comprises at least one of:

an image reading unit configured to read an image from a document image;

an image forming unit configured to form an image on a recording paper sheet in response to image information;

a facsimile communication control unit configured to transmit an image to a transmission destination in accordance with a mutually predetermined communication protocol;

a user interface unit configured to issue a reception alert of information to the user that is part of a moving object; and a user identifying device configured to identify the user.

14. A non-transitory computer readable medium storing a program causing a computer to execute a process for controlling supplying of power, the process comprising:

causing a control apparatus to transition to one of a power supplied state that causes power to be supplied and a power shutoff state that shuts off the supplying of power, the control apparatus including:

a first memory control unit including a reference signal generator configured to generate a reference signal serving as a reference of a control operation, the first memory control unit being configured to write information to or read information from a first memory in response to the reference signal, and a communication line network control unit configured to control communications with a communication line network, the communication line network control unit including a second memory configured to temporarily store information, the second memory serving as a buffer between a transmission and reception speed of information from the communication line network and a processing speed of the first memory control unit operating in response to the reference signal; and determining a transition target of the transitioning in accordance with a first time period and a second time period, the first time period having a length of time beyond which no further memory space is available from the second memory, and thus being determined by the transmission and reception speed of the information to the communication line network and the storage capacity of the second memory, the second time period being so long as to enable the information stored on the second memory in the power shutoff state to be stored on the first memory via the first memory control unit.

15. A power supplying control apparatus comprising:

a transition unit configured to cause a control apparatus to transition to one of a power supplied state that causes power to be supplied and a power shutoff state that shuts off the supplying of power, the control apparatus including:

a first memory control unit including a reference signal generator configured to generate a reference signal serving as a reference of a control operation, the first memory control unit being configured to write information to or read information from a first memory in response to the reference signal, and a communication line network control unit configured to control communications with a communication line network, the communication line network control unit including a second memory configured to temporarily store information, the second memory serving as a buffer between a transmission and reception speed of information from the communication line network and a processing speed of the first memory control unit operating in response to the reference signal;

a determining unit configured to determine a transition target of the transition unit in accordance with a first time period and a second time period, the first time period having a length of time beyond which no further memory space is available from the second memory, and thus being determined by the transmission and reception speed of the information to the communication line network and the storage capacity of the second memory, the second time period being so long as to enable to be stored on the first memory, and including a recover time of the reference signal generator from the power shutoff state; and a reference signal generation control unit configured to shut off a supply of power to the reference signal generator in response to a power shutoff instruction from the transition unit if the first time period is longer than the second time period, and continues the supplying of power to the reference signal generator in response to the power shutoff instruction from the transition unit if the first time period is shorter than the second time period.

* * * * *